United States Patent [19]
Rentzsch et al.

[11] Patent Number: 5,454,265
[45] Date of Patent: Oct. 3, 1995

[54] INSTALLATION FOR THE MEASUREMENT OF THE ALTITUDE OF A SURFACE WIND, PARTICULARLY FOR IMPROVING THE HITTING ACCURACY OF UNGUIDED PROJECTILES

[75] Inventors: Max Rentzsch, Schnaittach; Johann Schreier, Buckersdorf; Raimar Steuer, Diepersdorf, all of Germany

[73] Assignee: Diehl GmbH & Co., Nuremberg, Germany

[21] Appl. No.: 183,713

[22] Filed: Jan. 19, 1994

Related U.S. Application Data

[63] Continuation-in-part of Ser. No. 900,127, Jun. 18, 1992, abandoned.

[30] Foreign Application Priority Data

Jun. 20, 1991 [DE] Germany ............... 41 20 367.4

[51] Int. Cl.$^6$ ................................................ G01W 1/00
[52] U.S. Cl. ........................................ 73/170.04; 73/167
[58] Field of Search ................... 364/420, 423; 73/167, 170.04, 170.28

[56] References Cited

U.S. PATENT DOCUMENTS

| | | | |
|---|---|---|---|
| 3,420,100 | 1/1969 | Dubois . | |
| 3,792,354 | 2/1974 | Slaght et al. | 73/167 |
| 3,862,584 | 1/1975 | Schmidt et al. . | |
| 4,514,621 | 4/1985 | Knight et al. | 364/423 |
| 4,698,489 | 10/1987 | Hickin et al. | 364/423 |

FOREIGN PATENT DOCUMENTS

| | | |
|---|---|---|
| 0261091 | 3/1988 | European Pat. Off. . |
| WO90/08936 | 8/1990 | European Pat. Off. . |
| 2455341 | 5/1976 | Germany . |
| 3932878 | 4/1991 | Germany . |
| 3117898 | 5/1991 | Japan . |

*Primary Examiner*—Richard E. Chilcot, Jr.
*Assistant Examiner*—R. Biegel
*Attorney, Agent, or Firm*—Scully, Scott, Murphy & Presser

[57] ABSTRACT

An installation for the measurement of the wind direction and the wind velocity of a ground wind dependent upon the altitude above the ground. More particularly, the installation is employed for improving the hitting accuracy of unguided projectiles or rockets. The installation incorporates a vertically-orientable firing barrel or launching tube for the launch or firing of a measuring projectile, a speed measuring installation for the measurement of the launching speed of the measuring projectile from the launching tube, an optical camera device for the photographing and digitalizing of successive pictures of the measuring projectile which is fired from the launching tube taken in timed sequence. The camera device is positioned adjacent the launching tube oriented in parallel therewith, an electronic data processing unit being connected with the camera device for determining the current position of the measuring projectile in accordance with the successive digitalized pictures, and a display arrangement which is operatively coupled with the electronic data processing unit for the display of the wind direction computed through the electronic data processing unit, and the velocity of the wind dependent upon the altitude of flight of the measuring projectile.

9 Claims, 3 Drawing Sheets

INSTALLATION FOR THE MEASUREMENT OF THE ALTITUDE OF A SURFACE WIND, PARTICULARLY FOR IMPROVING THE HITTING ACCURACY OF UNGUIDED PROJECTILES

CROSS-REFERENCE TO RELATED APPLICATIONS

This application is a continuation-in-part application of Ser. No. 07/900,127; filed on Jun., 18, 1992, now abandoned.

BACKGROUND OF THE INVENTION

1. Field of the Invention

The present invention relates to an installation for the measurement of the wind direction and the wind velocity of a ground wind dependent upon the altitude above the ground. More particularly, the installation is employed for improving the hitting accuracy of unguided projectiles or rockets.

For effectuating the measurement or determination of an altitude profile; in essence, the wind direction and the wind velocity of a ground wind dependent upon the altitude above ground, there have been employed for a long period of time; in particular, installations incorporating weather balloons for such purposes, whose ascent or, in essence, path of flight is tracked, for example, through the intermediary of a radar beam, laser beam or infrared beam which is projected from a suitable radiating source. However, such a source for radiating the beam is quite expensive.

The above-mentioned ground wind can be considered as being present extending from the ground up to an altitude of a few hundred meters above the ground.

In order to attain the desired hitting accuracy for unguided ballistic rockets missiles or projectiles; in effect, such as artillery projectiles, it is of decisive significance that there be known the so-called wind profile in proximity to the ground. The term "proximity to the ground" in this case signifies an altitude of a few meters up to a few hundred meters above the firing location for the above-mentioned rockets, missiles or projectile. For the determination and measurement of the wind profile in proximity to the ground, heretofore there have also been already employed laser anemometers over a considerable length of time, and which are adapted to measure the movement of air at different altitudes. This procedure is; however, quite complex in nature.

2. Discussion of the Prior Art

From the disclosure of International PCT Application No. WO 90/08 936 there has become known a process and an installation for improving the aiming or hitting accuracy of projectiles which are launched from a firing installation. Through the utilization of a measurement device, there are in this instance measured the trajectories of pilot projectiles. The resultingly determined pilot projectile trajectories are then employed for correcting the firing components of the active or live projectiles. In this case, there is fired at least one pilot projectile in the direction towards potential or possibly known targets. From the trajectory of at least one pilot projectile there are then computed the specified parameters which exert an influence over the trajectory, and are then stored and subsequently incorporated into the computations for the firing components. A variant of this process determines, through the measurement of the initial part segment of the trajectory of the projectile; in effect, by means of the measurement of the start or launching phase, in itself alone the firing error of the effector, which is then incorporated into the computation for the firing components.

The disclosure of German Laid-Open Patent Application No. DE 39 32 878 A1 sets forth a process for determining and changing the trajectory of projectiles; especially that of a plurality of projectiles fired within a salvo from one or more barrels of an artillery turret or the like, whereby distance to a target is measured through the intermediary of a firing control installation and, during the flight, guidance information is transmitted to the projectile. In this instance, a selection of the given guidance information is implemented by the projectile itself.

The specification of U.S. Pat. No. 3,862,584 discloses a process for determining the deviation in the trajectory of a projectile which is caused by the influences of cross-winds. This deviation in the trajectory or; in essence, the drift of the projectile is determined in order to be able to pivot the firing barrel or launch for the projectile in a direction opposite relative to this drift, and in this manner to be able to compensate for the influence of the drift at a subsequent firing.

SUMMARY OF THE INVENTION

Accordingly, it is an object of the present invention to simplify an installation of the above-mentioned type and to resultingly produce a simple and time-saving precise determination or measurement of the altitude profile of a ground wind which is employed for the above-mentioned purposes.

The foregoing object is attained through an installation of the above-mentioned type incorporating a vertically-orientable firing barrel or launching tube for the launch or firing of a measuring projectile, a speed measuring installation for the measurement of the launching speed of the measuring projectile from the launching tube, an optical camera device for the photographing and digitalizing of successive pictures of the measuring projectile which is fired from the launching tube taken in timed sequence, whereby the camera device is positioned adjacent the launching tube oriented in parallel therewith, an electronic data processing unit connected with the camera device for determining the current position of the measuring projectile in accordance with the successive digitalized pictures, and a display arrangement which is operatively coupled with the electronic data processing unit for the display of the wind direction computed through the electronic data processing unit, and the velocity of the wind dependent upon the altitude of flight of the measuring projectile.

Preferred modifications and further embodiments of the inventive installation may be ascertained from the following detailed description as set forth hereinbelow.

The inventive installation is in particularly adapted for effectuating an improvement in the aiming or hitting accuracy of artillery projectiles or, in effect, unguided ballistic rockets, in view of which the installation is preferably operatively connected with a firing control installation for the projectiles or rockets. In the same manner, it is possible to also utilize the inventive installation for implementing the measurement of meteorological data; in essence, for example, as a replacement for weather balloons.

Through the employment of the inventive arrangement there are derived the advantages that it is not necessary to provide any complex information transmission paths; that it is less expensive than a corresponding laser beam, radar beam or infrared beam trajectory tracking installation; that it forms an autonomously operating measuring system; that the processing of the pictures is simple due to the camera device operating within the visible wave spectrum; and that it is rapidly and universally employable with good operating comfort.

BRIEF DESCRIPTION OF THE DRAWINGS

Further details, features and advantages of the invention may now be more readily ascertained from the following detailed description of a generally diagrammatically represented exemplary embodiment of the installation and mode of operation thereof, taken in conjunction with the accompanying drawings; in which.

DETAILED DESCRIPTION OF A PREFERRED EMBODIMENT

Figure 1:
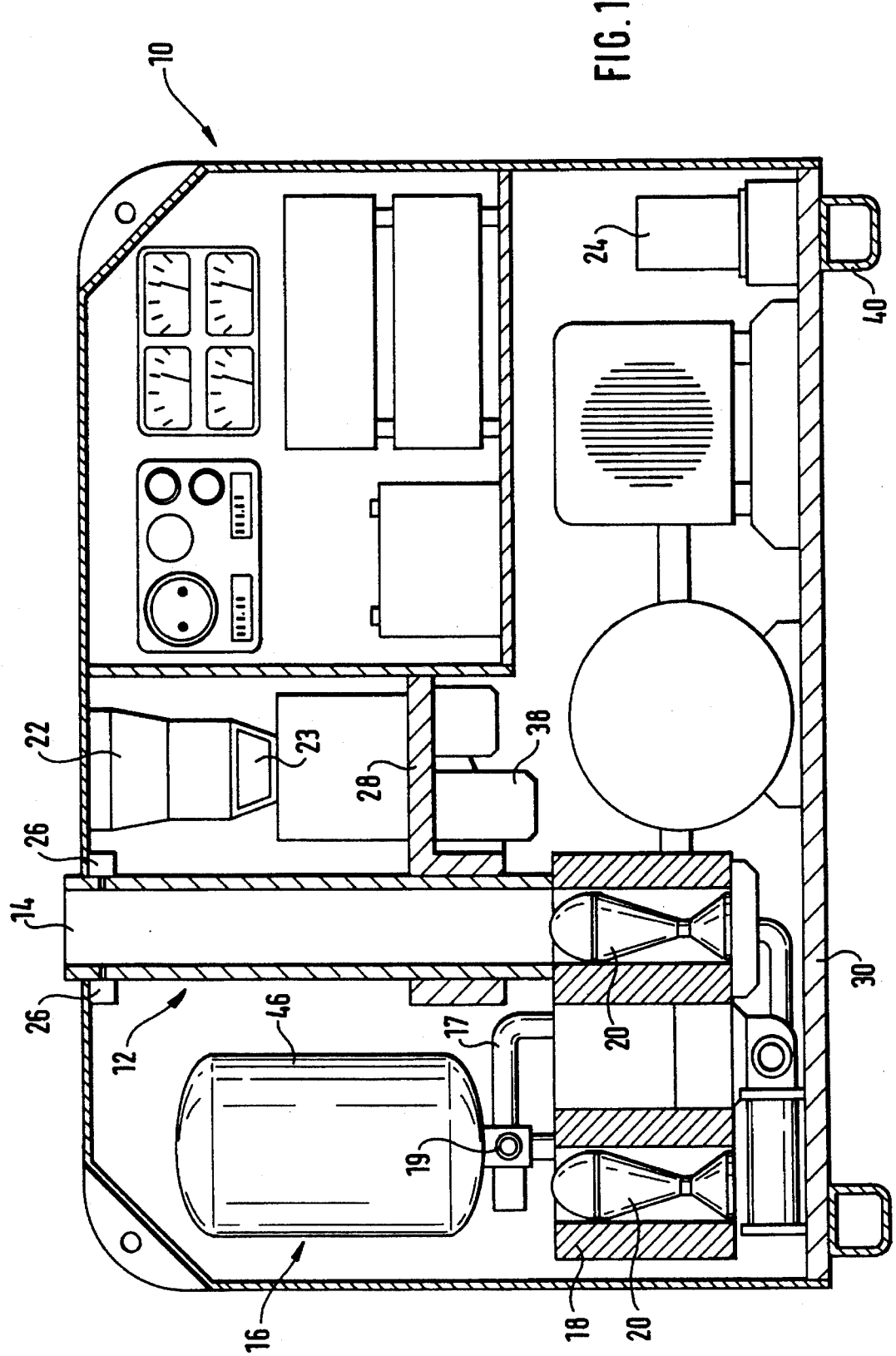
FIG. 1 illustrates a sectional view through the inventive installation.

FIG. 1 illustrates, generally diagrammatically, the construction of the installation 10. The installation 10 possesses a firing or launching unit 12 possessing a firing barrel or launch tube 14 and a compressed-air supply 16, as well as a magazine arrangement 18 for the automatic conveyance of a measuring projectile 20 to the launch tube 14. The compressed-air supply 16 possesses a compressed-air container 46 which, through the interposition of a conduit 17, is fluidically connected with the magazine arrangement 18. The conduit 17 is equipped with a quick-acting valve 19.

Moreover, the installation 10 possesses an optical camera device 22 with a correlated objective or lens, a measurement data recording device, as well as a data processing unit 32. With regard to the above-mentioned camera 22, this preferably pertains to a CCD-camera (charged-coupling display) with a CCD-chip 23. A positional reference system with an automatic leveling device and a Nord-reference, as well as a measuring system for meteorological ground data is expediently also provided in the installation 10.

An automatic ground wind measurement is initiated upon the activation of the installation 10. Through the supplying thereof with energy, there are activated all electrical systems of the installation 10. A leveling device 24 adjusts the launch tube 14 into a vertical orientation. Subsequent to the conclusion of the orienting procedure, the CCD-camera 32 is in a state of readiness for commencing the taking of pictures or photographing, and the data processing unit 32 or; in essence, its computer system, is activated.

The firing of a measuring projectile 20 is implemented by means of a mechanically-secured pressure or push-button switch or; in effect, through the above-mentioned quick-action valve 19.

The picture or photographic processing is started through a light barrier 26 which is located at the end or muzzle of the launch tube 14 for implementing the measurement of the firing or launching velocity of the measuring projectile 20, and as a result, there is established a common time basis between the survey of the projectile and the trajectory of the measuring projectile 20. The drift of the measuring projectile 20 determines itself from the measured or surveyed position with reference to the precise vertical center axis of the CCD-camera 22 or; in essence, the therewith associated CCD-chip 23. From these measured data and the launching velocity of the measuring projectile 20, it is accordingly possible to reproduce a three-dimensional trajectory of the measuring projectile 20, and to be able to compute the wind profile; in essence, the wind direction and the wind velocity of a ground wind dependent upon the altitude above ground.

In addition to the data for the wind intensity and for the wind direction, there can additionally be measured on the ground the barometric pressure and the temperature, and then recalculated for the individual altitude layers. With the data for the wind velocity, the wind direction, the temperature in the air pressure, there is then present a complete meteorological data input, which is suitable for introduction into a firing control computer.

Figure 2:
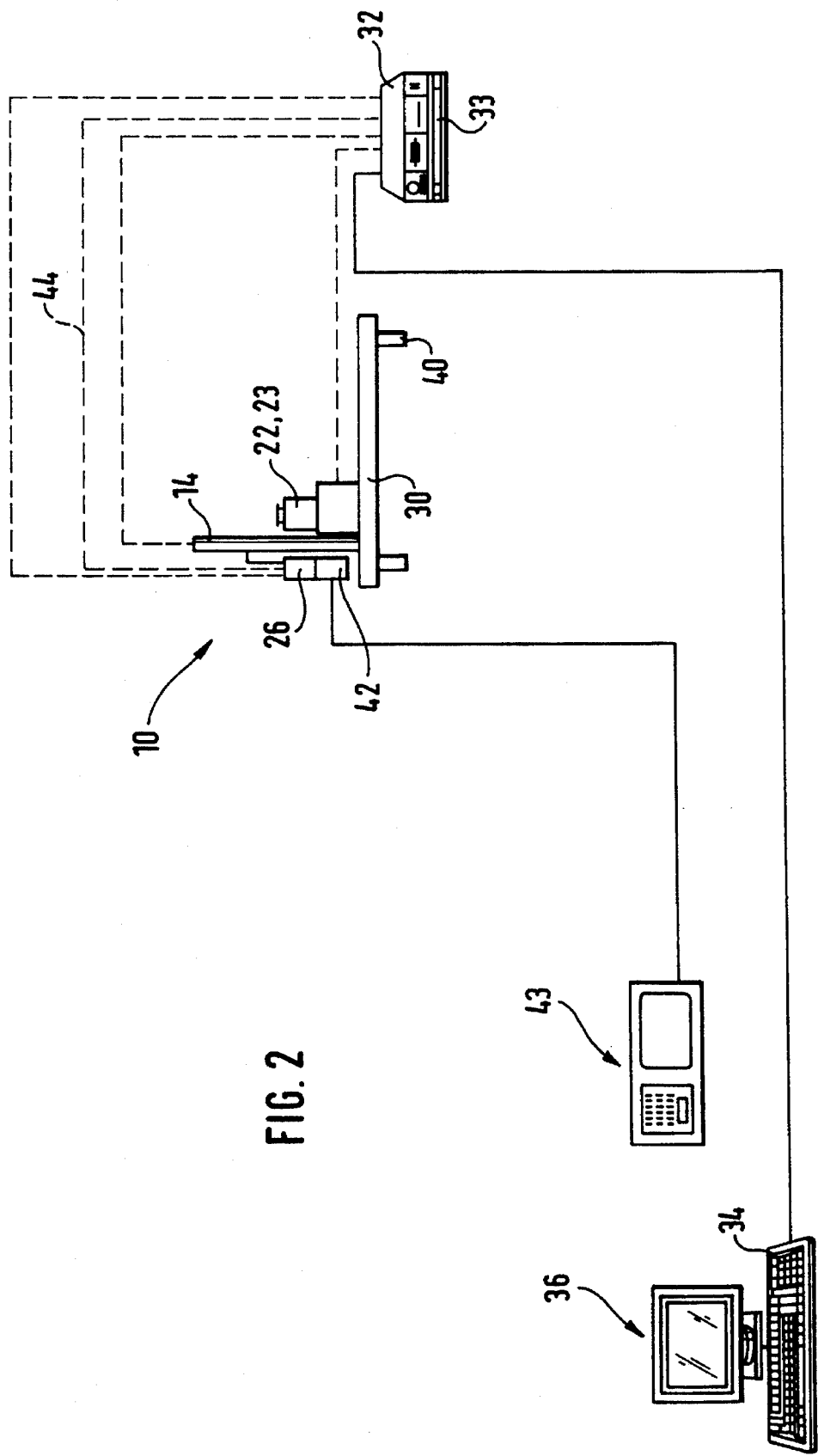
FIG. 2 illustrates essential components or groups of component of the installation of FIG. 1.

As can be ascertained from FIG. 1, the launch tube 14 and the pressurized or compressed-air container 16 with the electrical quick-action valve 16 are located on a automatically leveling base plate 30, as can also be ascertained from FIG. 2. The CCD-camera 22 with the CCD-chip 23 is arranged on an adjustable sensor platform 28, which is located on the launch tube 14.

An industry-personal computer of the data processing unit 32, in addition to the data storage also assumes the picture or photography evaluation, the operational control of the installation 10, as well as the experimental evaluation, whereby for the display of the wind velocities and wind directions which have been computed by means of the electronic data processing unit 32 dependent upon the altitude of the measuring projectile 20 above ground, the data processing unit 32 can be combined with a printer, a monitor or another suitable display device 33, as shown in FIG. 2. The installation 10 is controlled and monitored by means of a keyboard 34 with a control monitor 36.

In the utilization of the installation 10 it has evidenced itself that the observation of measuring projectiles 20 is simply implementable when the initial launch errors of the measuring projectiles 20 lie within specified limiting values. For this purpose, the installation 10 is equipped with the electronic leveling device 24. Essential components of the leveling device are a positional sensor 38, drive motors and supports or legs 40 which extend downwardly from the base plate 30, as shown in FIG. 1. The motors serve for the precisely defined adjustment in the lengths of the supports or legs 40. Expediently, there are provided two supports 40 which are changeable in their lengths, as well as two further rigid supports, as a result of which there are specified three points and thereby a plane. The base plate 30, in this manner, can be maintained in two spatial axes in the vertical. Deviations from the ideal perpendicular bearing relative to earth can be sensed; for example, with the aid of an inclinometer pendulum of the positional sensor 38. Employable as positional sensors are; for example, sensors of the type designation PMP-S10T-SW2.

A pitching motion of the base plate 30 can be produced through a synonymous adjustment of the supports or legs 40. Through an oppositely-directed adjustment of the two supports 40, of which in FIG. 1 only one support 40 is visible, there can be achieved a movement of the base plate 30 about the roll axis.

For the determination and evaluation of the wind velocity and the wind direction as a function of the altitude above ground, there is required an actual information over the altitude of the measuring projectile 20. Inventively, the actual altitude of the measuring projectile 20 is computed at every suitable point in time through its initial, in essence, launch or firing velocity from the launch tube 14. For this purpose, there is provided the IR-light barrier 26, whose light beam is interrupted during the passage through the barrel or launch tube by the measuring projectile 20 for a period of time typical for the projectile 20 and the launching velocity. From the known length of the projectile 20 and the frequency of a counting oscillator 42 which is operatively interconnected with the IR-light barrier 26, as shown in FIG. 2, there can be computed the muzzle velocity of the measuring projectile 20. The count condition of the counting oscillator 42; in effect, then represents the corresponding value of the velocity of the measuring projectile 20 upon exiting from the launch tube 14. The count condition of the counting oscillator 42 is then recomputed in the data processing unit 32 into the corresponding initial or starting velocity of the measuring projectile 20. Connected with the counting oscillator 42 is a display device 43, as shown in FIG. 2, which is provided for the display of the mentioned initial or starting velocity of the measuring projectile 20.

Concurrently with the interruption of the beam of light from the IR-light barrier 26, there is indicated to the data processing unit 32 the passage of the measuring projectile 20 through the intermediary of a status line 44. This signal can be employed for the triggering of the pixel data recording of the CCD-camera 22 or; in essence, the CCD-chip 23 of the above-mentioned camera 22.

The optical camera device 22, by means of which the measuring projectile 20 is surveyed during the ascending phase of flight is; for example, a CCD-shutter camera of Type 22 RS with a 35 mm lens having a focal length of 105 mm. The shutter camera 22 is equipped with the CCD-chip 23. The CCD-chip 23 evidence; for instance, 512×512 pixel.

The integration of the CCD-camera 22 into the installation 10 is implemented in such a manner that the optical axis of the camera 22 is oriented precisely in parallel with the axis of the launch tube 14. For this purpose, there is provided the already herein above-mentioned platform 28, as shown in FIG. 1, which is adjustable about three axes and mounted directly on the launch tube 14.

With the aid of the inventive installation 10, or; in essence, with the aid of its camera device 22, there is effected a continuous photographing of pictures or images of the measuring projectile 20 after its firing from the launch tube 14, as well as the determination of the current position of the measuring projectile 20 from the successive digitalized images from the CCD-chip 23 of the CCD-camera 22. The picture or image processing can be carried out by means of a PC-diskette of the Type DT2861 from the company Data Translation, which is provided in the data processing unit 32.

After the firing or launch of the measuring projectile 20, the CCD-camera 22, commence the taking of continuous binary images or pictures. A program module which is provided in the data processing unit 32 for the determination of coordinates, sequentially processes all of the binary pictures which have been taken in a chronological order, and, as a final result, writes for instance a list of the current projectile positions as a digitalized image in a data file.

The data evaluation for the determination of the ground wind profile; in effect, the wind direction and wind velocity dependent upon the altitude above ground, is carried out through the pictorial evaluation of the pixel positions obtained from the CCD-chip 23 of the CCD-camera 22 by means of the data processing unit 32 in a chronological sequence. For every position of the measuring projectile 20 there is computed from the measured initial or starting velocity the correspondingly associated altitude of flight. The required time axis is determined through the pictorial frequency of the successive digitalized pictures from the camera 22. In this manner there is generated a three-dimensional trajectory for the measuring projectile 20, whose deviation from the vertical represents a measure for the wind reigning at the corresponding altitude in accordance with wind velocity and wind direction.

The measuring projectile 20 is expediently fired by means of compressed air. The compressed air can be stored in the container 46 of the compressed-air supply 16.

Figure 3B:
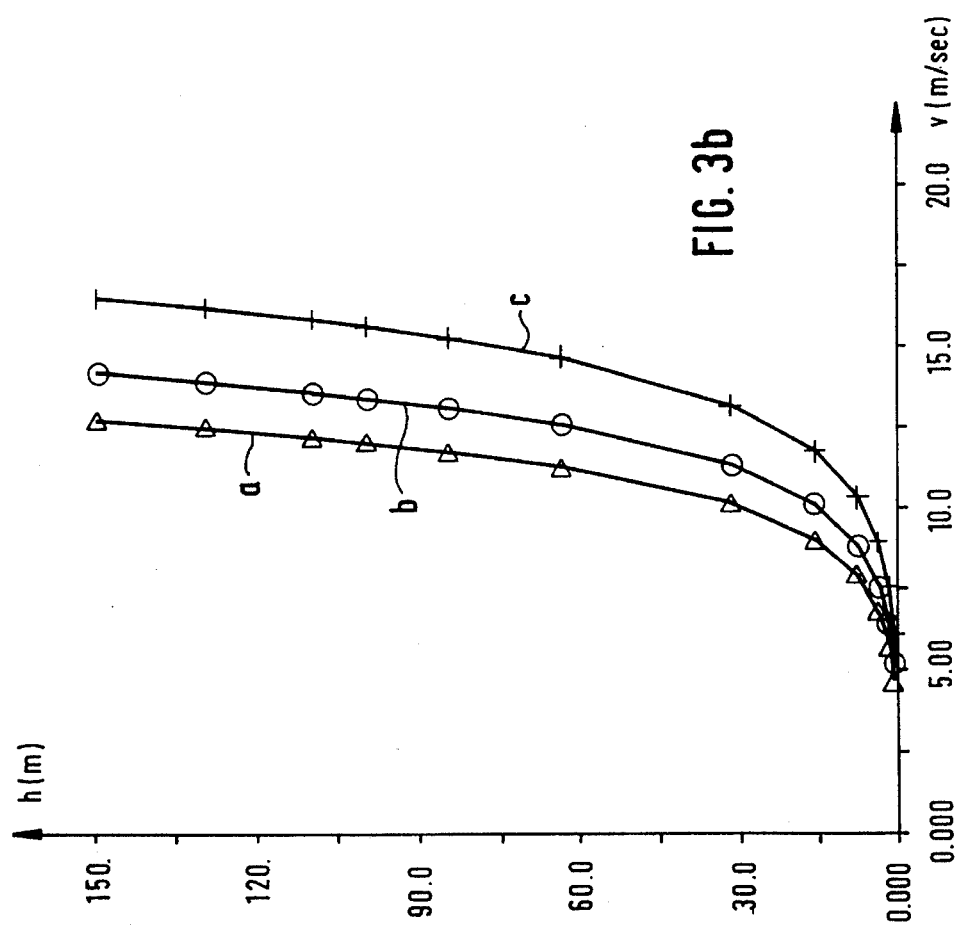
FIGS. 3a and 3b, respectively, illustrate graphically plotted representations of wind profiles which are through the installation of FIGS. 1 and 2; in effect, graphically plotted representations of the wind direction and the wind velocity dependent upon the altitude above ground.
Figure 3A:
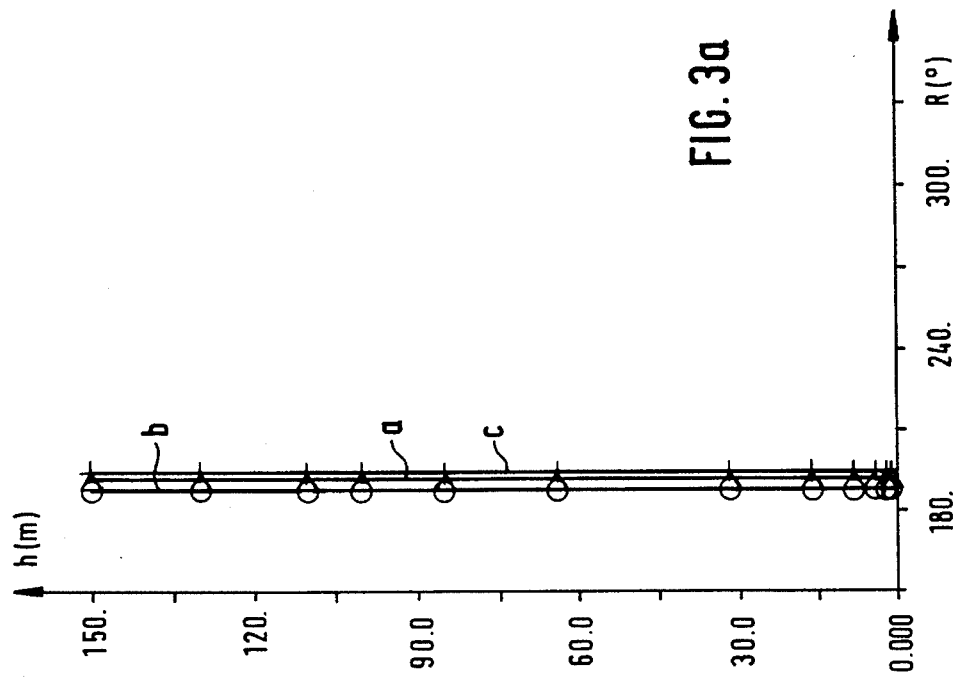

FIG. 3a illustrates, as determined by the inventive installation 10, the interrelationship of the wind direction R measured in degree of angle or radius dependent upon the altitude h in meters above ground; and FIG. 2 illustrates as determined by means of installation 10, the interrelationship of the wind velocity v in meters/sec. dependent upon the altitude h in meters above ground, whereby the curves a, b and c are each presently associated with different firing or launch times for measuring projectiles 20.

Comparisons between the wind profile as determined through the utilization of the inventive installation with a wind profile obtained by means of a meteorological weather station have evidenced that the inventive installation 10 functions with a high degree of accuracy.

What is claimed is:

1. An installation for determining the wind direction and the wind velocity of a ground wind dependent upon altitude above ground for improving the hitting accuracy of unguided projectiles; comprising a vertically-oriented launch tube for the firing of a measuring projectile; velocity measuring means for the measurement of the starting velocity of the measuring projectile from said launch tube; optical camera for photographing and digitalizing in timed succession a plurality of pictures of the measuring projectile fired from the launch tube, said optical camera being located adjacent said launch tube and extending in parallel therewith; an electronic data processing unit operatively connected with said optical camera for the determination of the current position of the measuring projectile corresponding to the successive digitalized pictures; and display means coupled with said electronic data processing unit for the display of the wind direction and the wind velocity dependent upon the altitude of the measuring projectile as computed by said electronic data processing unit.

2. An installation as claimed in claim 1, comprising a magazine arrangement for the storage of a plurality of said measuring projectiles, said launch tube being positioned proximate said magazine arrangement.

3. An installation as claimed in claim 2, wherein a compressed air container is operatively connected through a conduit with said magazine arrangement.

4. An installation as claimed in claim 3, wherein an electronic quick-action valve is located in said conduit.

5. An installation as claimed in claim 1, wherein a base plate supports said launch tube; means for adjusting the level of said base plate; a sensor platform supporting said optical camera; and means for adjusting the level of said sensor platform.

6. An installation as claimed in claim 1, wherein said velocity measuring comprises an IR-light barrier; a counting oscillator operatively coupled with said light barrier; said counting oscillator providing a current count condition which is recomputed in said electronic data processing unit into the starting velocity of the measuring projectile.

7. An installation as claimed in claim 1, wherein said optical camera device comprises a CCD-shutter camera having a CCD-chip for digitalizing said successive pictures.

8. An installation as claimed in claim 1, for improvement of the hitting accuracy of artillery projectiles and unguided ballistic rockets; and a firing control installation for the projectiles and rockets being operatively connected to said first-mentioned installation.

9. An installation as claimed in claim 1, wherein said installation measures meteorological data.

* * * * *